Figure 1:
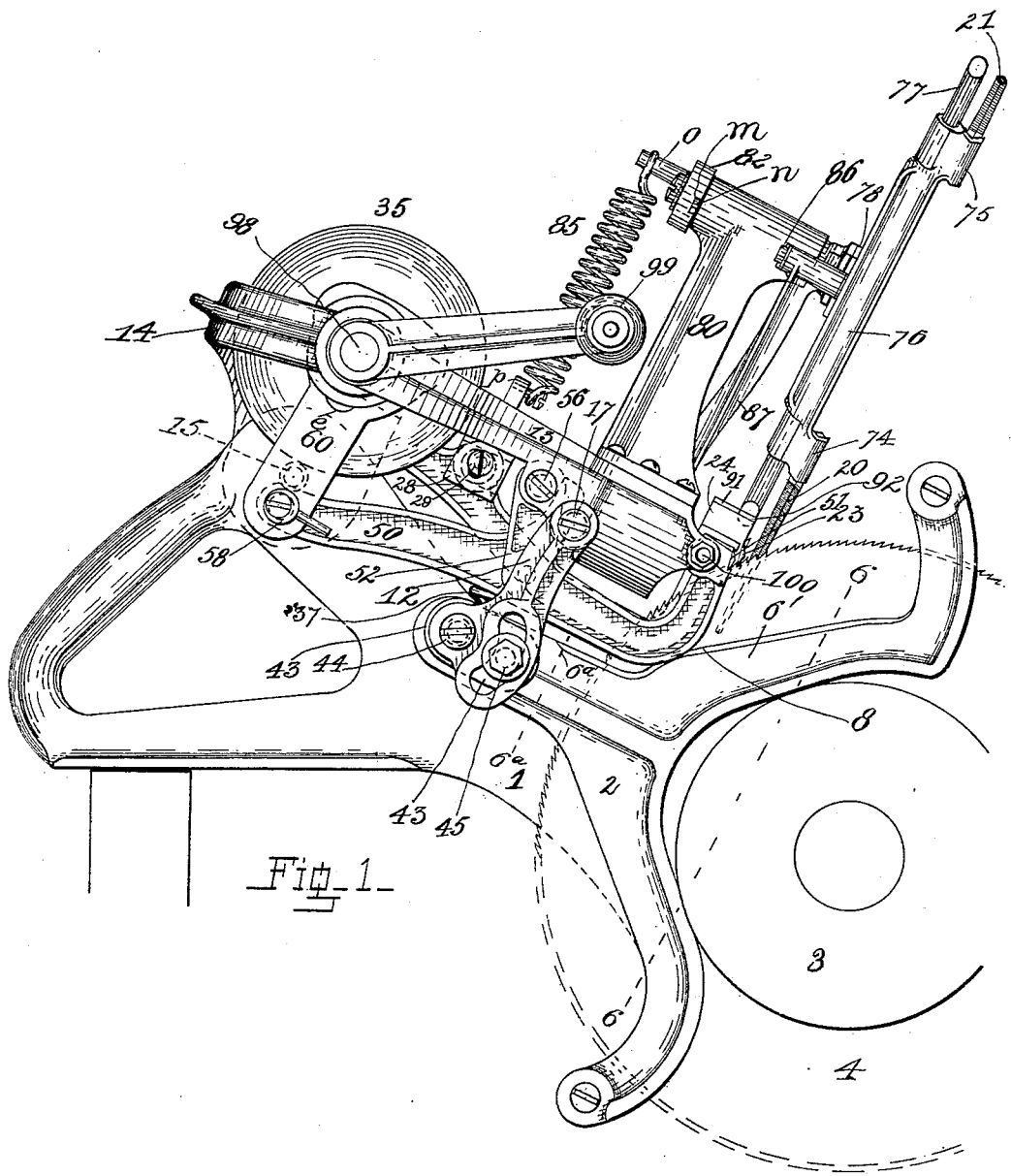

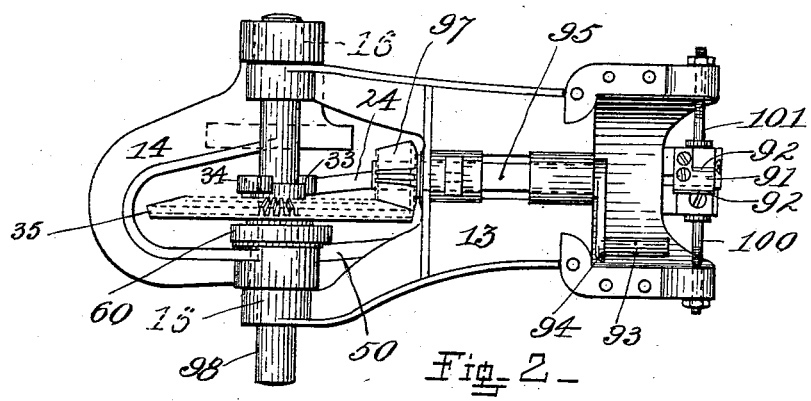
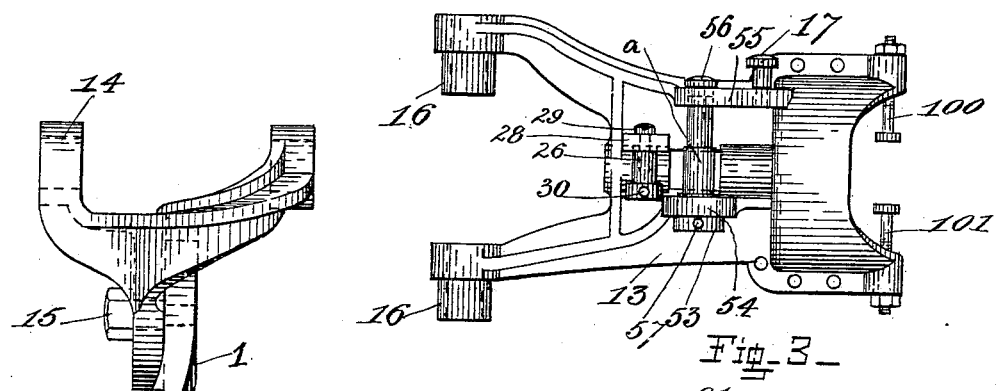
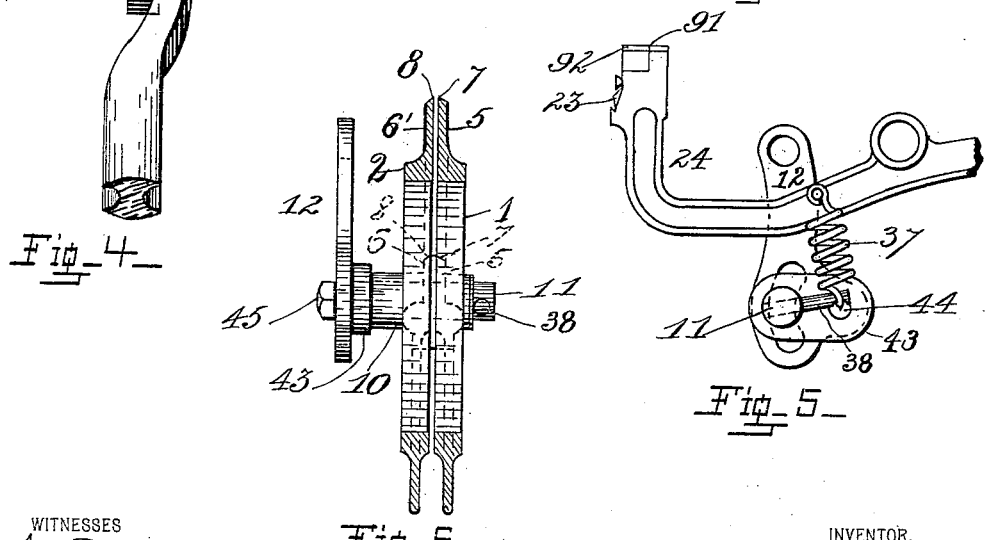

No. 620,727. Patented Mar. 7, 1899.
A. A. WOOD.
GIN SAW FILING MACHINE.
(Application filed Dec. 4, 1897. Renewed Feb. 8, 1899.)
(No Model.) 4 Sheets—Sheet 3.
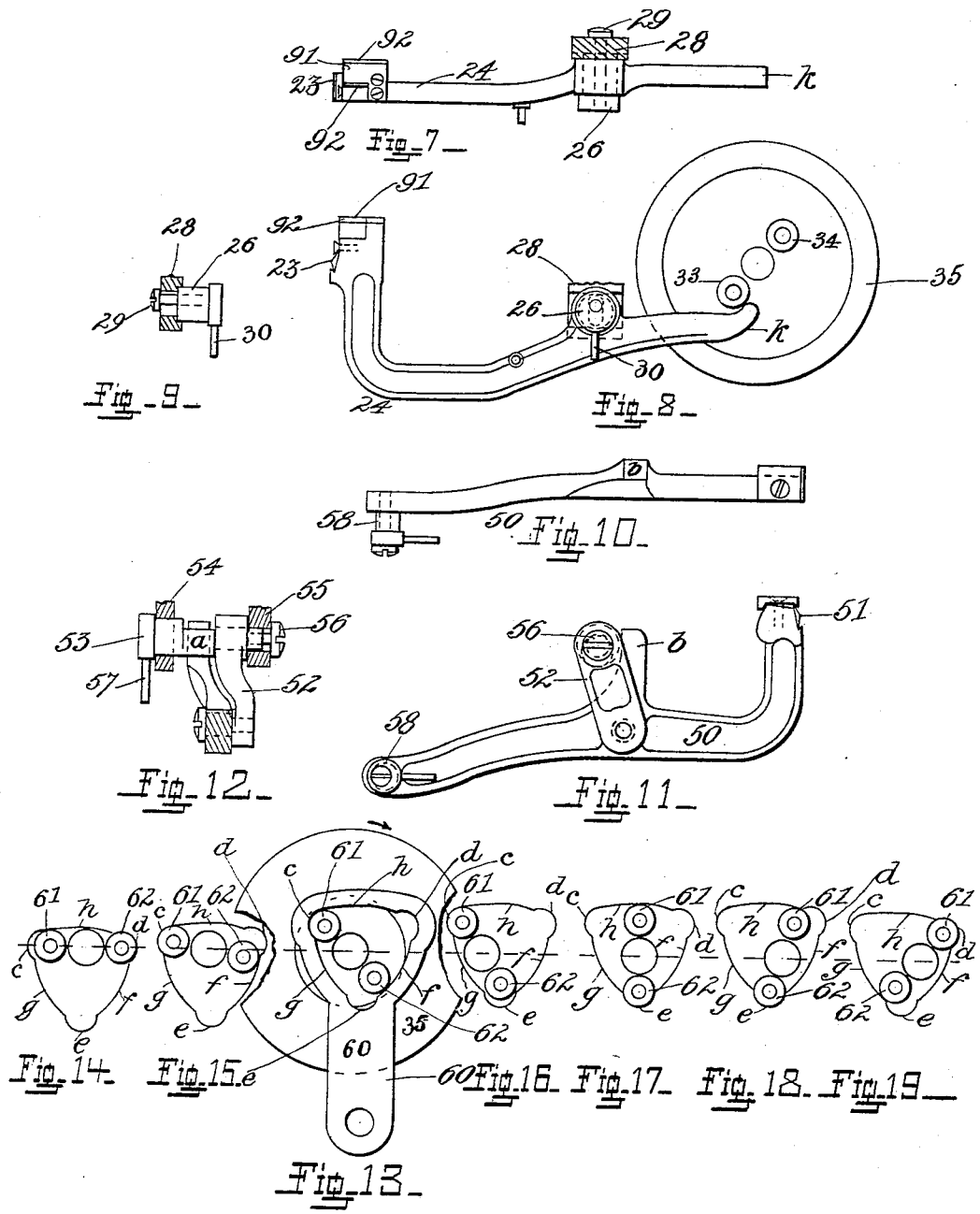

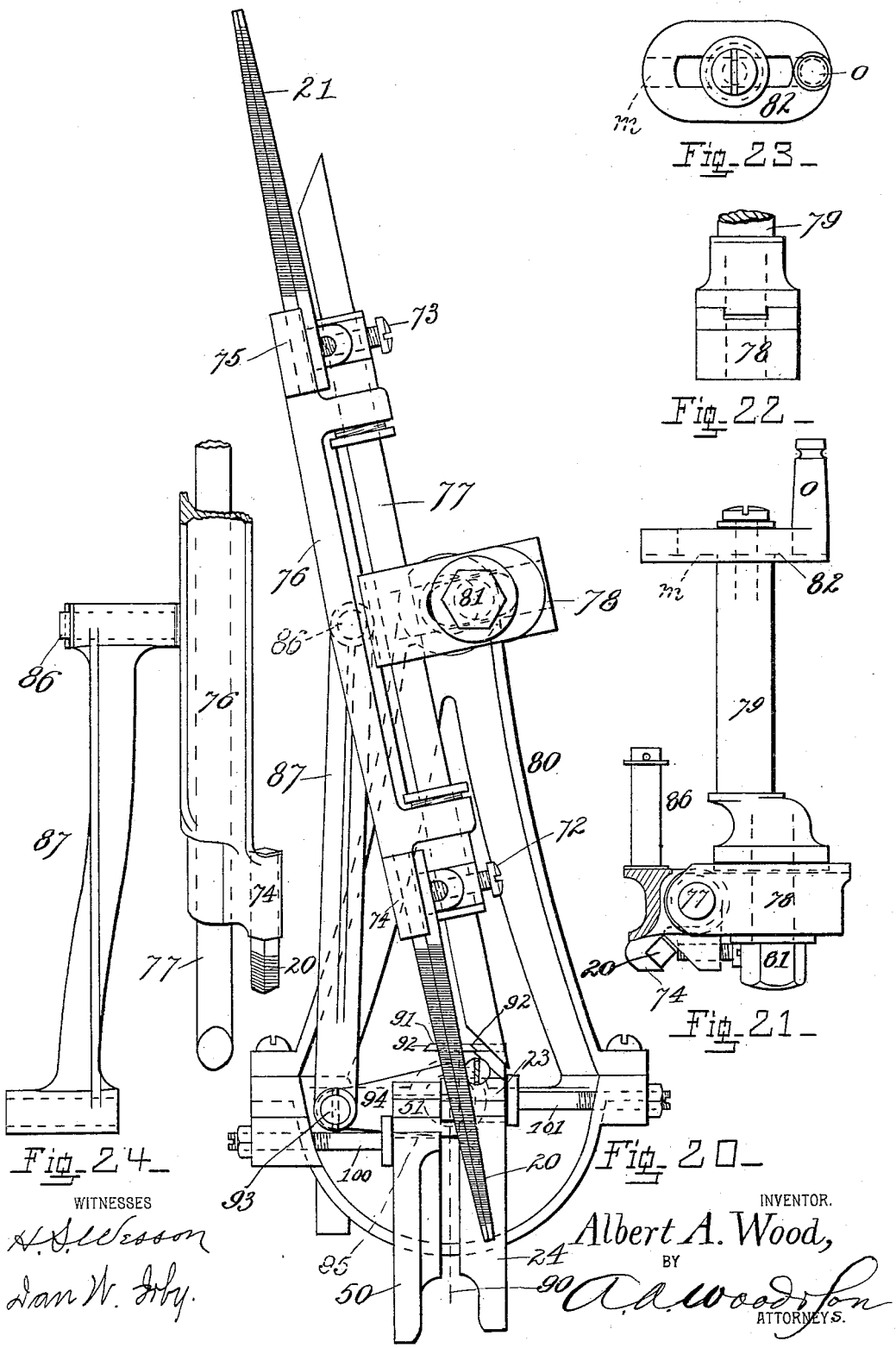

UNITED STATES PATENT OFFICE.

ALBERT A. WOOD, OF ATLANTA, GEORGIA.

GIN-SAW-FILING MACHINE.

SPECIFICATION forming part of Letters Patent No. 620,727, dated March 7, 1899.

Application filed December 4, 1897. Renewed February 8, 1899. Serial No. 704,990. (No model.)

*To all whom it may concern:*

Be it known that I, ALBERT A. WOOD, a citizen of the United States of America, and a resident of Atlanta, in the county of Fulton and State of Georgia, have made a certain new and useful Improvement in Gin-Saw-Filing Machines; and I do hereby declare the following to be a full, clear, and exact description of the invention, reference being had to the accompanying drawings, and to letters and figures of reference marked thereon, which form a part of this specification.

This invention relates to devices for sharpening the saws of cotton-gins by filing the teeth from base to point and bringing the points to sharpness, whereby the teeth are brought from a worn condition to their original condition.

The invention consists of the novel elements and combinations thereof, as hereinafter set forth.

An understanding of the mechanism here shown in some of its details will be facilitated by reference to my application for Letters Patent for a gin-saw gummer filed of even date herewith and serially numbered 660,792.

The device in one of its forms is shown in the accompanying drawings, as follows:

Figure 1 is a side elevation of the machine, showing it in position on a saw and resting on the space-blocks and a support. In Fig. 1, as will be seen, the mechanism has a general inclination, which is its correct position when at work; but for convenience in the following description views on a plane through the axes of the shafts will be called "plans" and at a right angle thereto "elevations," as if the axes of those shafts were on a horizontal plane. For convenience and to conform to the nomenclature usually employed by manufacturers of this class of machinery the part that rests on the space-blocks will be called the "stand" and the part that carries the shafts and most of the moving elements will be called the "frame." The part that forms the hinged connection of the frame and stand will be called the "hinging-piece." Fig. 2 is a plan of the frame and hinging-piece. This figure also shows the two shafts and their geared connection and the crank that reciprocates the file, also the forward end of the feeding and retaining levers. The upwardly-projecting bearing carrying a part of the mechanism is not shown in this figure. Fig. 3 is an inverted plan of the frame. Fig. 4 is an end elevation from the left end, as shown in Figs. 1 and 2, of the hinging-piece and shows its connection with the stand; a small portion of which is also shown in this figure. Fig. 5 is an elevation from the back side, as shown in Fig. 1, of the retaining-pawl and its connection by a pulling coil-spring to a semirotating shaft that passes through the frame. Fig. 6 is a section on the line 6 6, Fig. 1. A subsection in broken lines on line 6 *a*, Fig. 1, is also shown in this figure. Fig. 7 is a plan of the retaining-lever and its connection to a lug on the frame. Fig. 8 is a side elevation of the retaining-lever and the gear carrying the rollers by which it is actuated. Fig. 9 shows the eccentrically-connected stud on which the retaining-lever is pivoted. Fig. 10 is a plan of the feed-lever. Fig. 11 is a side elevation of the feed-lever and the pendulous arm or link to which it is pivoted. Fig. 12 is a cross-section through the feed-lever and shows the pendulous arm, the pin on which the arm is carried, and in section the lugs through which the pin passes. Fig. 13 shows the connection by which the feed-lever is connected with the double crank on the larger of the two bevel-gears. Figs. 14, 15, 16, 17, 18, and 19 are diagrams that in connection with Fig. 13 show successive positions of the double crank that in conjunction with the heart-shaped opening in the connection causes a complete stroke and return of the feed-lever to each half-revolution of said crank. Fig. 20 is an enlarged elevation of one end of the frame, showing the files, the file-carrier, and its guide, the upwardly-projecting frame-bracket on which the file-carrier guide is reciprocably carried, the crank that reciprocates the files, and its connections with the file-carrier. The retaining and feed pawls are also shown in this figure. Fig. 21 shows the shaft to which the file-carrier guide is adjustably attached and the arm to which is attached the spring that applies pressure to the file. Fig. 22 shows the tongue-and-groove connection of the arm that carries the file-carrier guide with the shaft shown in Fig. 21. Fig. 23 is another view of the arm shown in Fig. 21 and to which the file pressure-spring is attached. Fig. 24 is a detail of a part of the file-carrier, the pitman that connects it to the crank, and the guide on which it slides.

In Fig. 1 the stand composed of the parts 1 and 2 is shown as resting on the space-blocks 3 of a cotton-gin, the saw 4 passing into a slit between the two parts. The stand is further shown in Figs. 4 and 6. In Fig. 6 it will be seen that the upwardly-rising webs or flanges 5 and 6' are beveled and present a cutting or scraping edge to any lint and gum that often adhere to an old saw and that would otherwise clog the saw in the slit through which it is obliged to pass in being fed around to be filed. It not being practicable on account of the files passing in close proximity to place these flanges central to the parts 1 and 2, as is done on the bottom half of the bifurcated portion of the stand, they are brought into immediate contact with the saw and made, by reason of the cutting edges 7 and 8, to scrape the lint and gum from the saw as it turns. It will also be seen by reference to Fig. 6 that there is a journal-bearing box 10 on the stand for the shaft 11 of the arm 12 that connects the stand to the frame 13, as will be hereinafter described. The frame is also connected to the stand by the hinging-piece 14, as shown in Figs. 1, 2, and 4. The hinging-piece 14 is attached to the stand by means of a shoulder-screw 15 and to the frame by the trunnions 16. (Shown in Fig. 3.) Both these connections are shown in Fig. 1, and they are shown separately in Figs. 2 and 4, and it will be also seen that the hinging-piece has a free hinge movement on both the trunnions and the shoulder-screw. The arm 12 is pivoted to the frame by means of a shoulder-screw 17, Figs. 1 and 3. By reason of the hinging or pivoting of the hinging-piece and arm 12 to both the stand and frame the frame will have a swinging movement toward and from the saw to permit the file 20 or 21 and the bit 23, fastened on the end of the retaining-pawl 24, to adjust themselves to any varying radius of the saw as it is being fed down and to move forward one tooth at a time as often as the operation of feeding the saw occurs. The function of the retaining-pawl is to hold by its bit the frame of the machine, so as to cause a corner of the file to enter an interdental space. To adjust the space between the bit of the retaining-lever and the file to suit saws of different pitch, the retaining-pawl is pivoted on a rotatable stud 26, Figs. 3, 7, 8, and 9, said stud entering into a horizontal groove in the downwardly-projecting lug 28 to prevent vertical displacement and being attached to said lug by a screw 29, that is tapped eccentrically into said stud and passes through a vertical slot in said lug, as is best shown in Figs. 8 and 9. It will be seen that to partially rotate this stud, which may be done by its handle 30, will not change the vertical position of the pivotal point of the retaining-lever, but will, by reason of the eccentrically-placed screw being in a vertical slot, change the distance as required between the bit 23 and the file that is operating on the saw. The retaining-pawl is in the form of a lever having a rearward extension $k$, that is depressed by the passing of the rollers 33 or 34 on the bevel-gear 35, Figs. 2 and 8, which will lift the bit 23 out of an interdental space and allow it to pass to the next space and with it the frame carrying the file. The lifting of the file to allow it to pass over a tooth and the stopping of the forward movement just at the desired place will be hereinafter described.

The forward movement of the frame is produced partly by gravity owing to the inclination thereof, but mainly and more positively by the action of the spring 37, which is a pulling-spring, and is attached at one end to a stationary abutment when it is to be merely used to cause this forward movement of the frame or to the retaining-pawl 24, as shown in Fig. 5, when it is desired to add the function of depressing the said pawl, the lower end of said spring 37 being attached to an arm or radial stud 38, projecting from a rotatable shaft 11, mounted in the stand and passing through the same, an arm 12 being secured to the end opposite the arm 38, as shown in Figs. 1, 5, and 6, and, projecting upwardly, is secured pivotally to the frame by a screw 17. Now it is obvious that a partial rotation of the shaft 11 will swing the arm 12 forwardly at its upper end and carry with it the frame. In order to keep the tension of this spring uniform whether the frame is at its highest or lowest point of adjustment and in so doing to provide for an equable force exerted on the frame and the retaining-pawl 24, the connection between the shaft 11 and the arm 12 is made in the following manner: An arm 43 is set rigidly upon said shaft, projecting the same direction and distance as the arm 38, and to the end of this arm, at a point equally distant radially from the shaft 11 as is the attachment of the spring 37 to the arm 38, I attach pivotally the lower end of the arm 12 by a screw 44, a segmental slot and screw 45 serving to make this pivotal connection rigid at any point of adjustment. The theory of this is that the lower attachment of the spring 37 being at the axis of the shoulder-screw 44 and the distance between said shoulder-screw and the shoulder-screw 17 being always the same the distance between said lower attachment of the spring 37 and its attachment to the retaining-pawl will always remain practically uniform—that is to say, the lower attachment of the spring will be raised with the frame.

The feed-lever 50, Figs. 1, 11, and 12, feeds the saw by means of a bit 51. It is pivoted on the free end of the link or pendulous arm 52. The pendulous arm is journaled on a pin 53. (Shown also in Figs. 3 and 12.) This pin passes also through the lugs 54 and 55, projecting downwardly from the frame. It will be seen by reference to Fig. 12 that a shoulder on this pin rests on lug 54 and that it does not reach entirely through the lug 55, so that the screw 56 draws the shoulder on the pin firmly against the lug 54 and prevents the accidental turning of the pin. The middle portion $a$ of the pin is eccentric and, as will be seen in Figs. 11 and 12, abuts against an upward projection $b$ on the feed-lever 50. The feed-lever when in engagement with the saw by its bit 51 stops the forward movement of the frame, carrying the retaining-pawl and file by the contact of the eccentric part $a$ with the upward projection $b$. Consequently the pin 53 should be turned by the handle 57 so that the eccentric part $a$ will be in the position that will let the frame move forward just sufficiently to carry the file and retaining-pawl over one tooth. It will hereinafter be explained how the lifting of the retaining-pawl from the interdented space will cause the file to be lifted also.

The feed-lever is actuated by a double crank, consisting of two rollers on crank-wrists 61 and 62 on the back of the gear 35, through the pitman 60, which is attached to the feed-lever by an eccentric bushing 58. The turning of the eccentric bushing 58 will adjust the feed-bit 51 to work between vibratory limits that will bring the saw down only so much as will allow the retaining-pawl to pass over a tooth when the bit 23 of the retaining-pawl is lifted by one of the rollers 33 or 34 on the gear 35, Fig. 8. The gear 35 on the shaft 98, which is the hand-crank shaft, being the most convenient element from which to transmit motion to the feed-lever, and its rotation being only half as often as the saw requires to be fed down, mechanism, consisting of two radially-opposite crank-wrists 61 and 62, preferably provided with antifriction-rollers on the back of the gear 35, operates in conjunction with the modified heart-shaped opening in the pitman 60 to give the feed-lever two strokes to each rotation of the said shaft 98 and revolution of the cranks. This operation is illustrated in Fig. 13 and in the diagrams Figs. 14 to 19, inclusive. In the diagrams only the rollers and the shaft 98 are shown in several of the successive positions they pass in making a half-revolution. A broken line is drawn through the axes of the shaft in these views for use in comparing the diagrams as to position of opening relative to said axis in height. Before proceeding to a description of the parts under immediate consideration attention is called to the fact that were the opening in the connection of the ordinary form of a heart-cam—that is to say, the three curved sides forming it being radial to the three corners or meeting-points of the lines—a sufficient additional radius being allowed to provide room for half the crank-wrist diameter, the entire upstroke of the pitman 60 would occur while the cranks were advancing from the position shown in Fig. 14 to that shown in Fig. 16. From the position shown in Fig. 16 to one midway between the positions in Figs. 18 and 19—that is to say, an additional one-third of a half-revolution—the pitman would be slightly depressed, then lifted, and then in the last third of the half-revolution it would be depressed to its original position. This would unfit it for use in a machine of this kind. By reference to Fig. 13 it will be seen that at each of the three corners of the opening in the pitman 60 are indentations $c$, $d$, and $e$ to suit the diameter of the rollers on the crank-wrists 61 and 62 and of a depth that will be described. For convenience each wrist and its roller will be called a "crank" and both together will be called a "double crank." The radial center of the indentation $c$ is also the radial center of the curved face $f$, and the radial center of the indentation $d$ is also the radial center of the curved face $g$; but the face $h$ is not radial to the indentation $e$ for reasons that will be given. The gear carrying the double cranks 61 and 62 turns in the direction indicated by the arrow in Fig. 13. In Fig. 14 the crank 62 is shown as being in the indentation $d$, the crank 61 having just arrived at the point of contact with the curved face $h$. The continued forward movement of the cranks will cause the crank 61 to lift the pitman, which will force the crank 62 out of its indentation and the crank 61 into the indentation $c$, as shown in Fig. 15. From the position shown in Fig. 15 the continued movement of the crank 61 will further lift the pitman, the crank 62 operating against the curved face $f$ (shown in Fig. 13) to keep the crank 61 in the indentation $c$ until the cranks shall arrive at the position shown in Fig. 16. But for the indentations the position shown in Fig. 16 would be the maximum height to which the pitman would be lifted, because the face $h$ would have to be on a curve from the axis of the wrist of the crank 62, Fig. 16, to allow the crank 61 to perform the next third of its half-revolution. It will be observed by reference to Fig. 16 that the crank 62 is not at its lowest point. The indentation $e$ should therefore be sufficiently deep to allow it to arrive at that point without depressing the connection. In fact, the surface $h$ from the point of contact of the crank 61 in Fig. 16 to its point of contact in Fig. 17 is somewhat straighter or flatter and the indentation somewhat deeper than is required to prevent the depression of the pitman that would occur at this point but for the indentation. It is made deeper in order that the straighter surface $h$ may cause the pitman to continue its upward movement to the point shown in Fig. 17. The part of the surface $h$ that is traversed by the crank 61 between the positions in Figs. 17 and 18 should be radial from the center or axis of the wrist of the crank 62, Figs. 17 and 18, by reason of which the pitman will continue its upward movement to the point shown in Fig. 18, which will be its highest point. The movement of the cranks as far as described accounts for practically two-thirds of a half-revolution, during all of which time the upward movement has been continuous and advantageous, inasmuch as the work of the feed-lever is done on this upward movement of the pitman and rear end of the feed-lever. It will be observed that except in the positions between that shown in Fig. 16 and the one shown in Fig. 18 no lost motion of consequence can occur on account of wear of parts, owing to the fact that one of the cranks will be in the indentation c or d all of the time. Attention is also called to the fact that during the time of the movement of the cranks from the position shown in Fig. 16 to that shown in Fig. 18 the feed-lever is moving the saw, and consequently the parts will be under tension, which will prevent any actual lost motion. From the position shown in Fig. 18 the forward movement of the cranks is continued past that shown in Fig. 19 to the original position. (Shown in Fig. 13.) The movement of the crank just described is one-half of a revolution, during which the feed-lever 50 will have, by its bit 51, moved the saw one tooth. While the feed-lever 50 is moving the saw forward and the bit 51 is pressed into the saw-teeth one of the rollers 33 or 34 should roll over and depress the rearward extension $k$ of the retaining-lever, which will permit the frame 13 and its incumbent parts to move forward by gravity and by the correlative action of the spring 37 until the eccentric portion $a$ of the pin 53 shall contact with the upward projection $b$ on the feed-lever, as shown in Figs. 11 and 12.

By reference to Figs. 20, 21, and 24 it will be seen that the files 20 and 21 are clamped by screws 72 and 73 in right-angled grooves in the parts 74 and 75 of the carrier 76 and that the carrier 76 is reciprocable on a guide-rod 77. The guide-rod 77 is fastened in an arm 78, that is provided with a slot and with a tongue-and-groove connection with shaft 79 and is fastened to it by a cap-screw 81, which is shown in Figs. 20, 21, and 22. The shaft 79 acts as a trunnion and is journaled on the upwardly-rising bracket 80, that is attached to the frame 13, as shown in Figs. 1 and 20. On one end of the shaft 79, Figs. 1 and 21, is an arm 82, that has on one side a groove into which fits a tongue $n$ on the shaft 79, and on the other side a stud $o$, to which is attached one end of the pulling-spring 85, the other end of the spring being attached to a screw or stud in the lug $p$ on the frame. The pulling-spring 85 will operate to put pressure on the file, as will be seen by examining Figs. 20 and 21 in connection with Fig. 1. The slot for the screw 81 in the arm 78, that connects it to the shaft 79, permits the lateral adjustment of the guide-rod 77, which, as will be seen by reference to Fig. 20, will cause the file to operate on the saw at a different angle and that both files will operate at equal angles, one side of the saw being filed by file 20 and the other by file 21. To change from the use of one file to the use of the other, the file that is out of use must be turned down by a partial revolution of the shaft 79. It will be seen by reference to Figs. 1 and 20 that roor is provided for the wrist 86 and the top end of the pitman 87 to pass without obstruction, and that the spring 85 should stand sufficient elongation to permit the reversal of the file and that the pulling tension of the spring will operate to apply pressure to either file that may be in position to operate on the saw.

It will be seen by reference to Figs. 7, 8, and 20 that the retaining-pawl 24 has attached a plate 91, having beveled edges 92, that project about equally on each side of the plane of the saw, which is shown by broken line 90, Fig. 20. It will also be observed that both ends of the guide-rod 77 are beveled, the beveled faces acting correlatively with the beveled edges of the plate just described to cause a deflection of the guide-rod that will lift the acting file away from the saw each time that the retaining-pawl is lifted to pass over a tooth, as has been described, the proportions and positions of these several parts being such as to cause a contact that will produce that result.

The file-carrier 76 is reciprocated by the crank 94 through its pitman 87, that connects it to the crank-wrist 93. As will be seen by Fig. 2, the crank 94 is on the shaft 95, that is driven by the gears 96 and 97 from the shaft 98, which is the hand-crank shaft, which shaft is provided with a hand-crank 99.

The feed-lever and the retaining-pawl are guided against lateral displacement by the adjusting-screws 100 and 101, Figs. 2, 3, and 20, that contact with said lever and pawl and are screwed into the frame, as shown in Figs. 1, 2, 3, and 20.

Having thus described my invention, what I claim as new, and desire to secure by Letters Patent of the United States, is—

1. In a gin-saw-filing machine, a stand consisting of a slitted fork adapted to rest on the periphery of the space-blocks and straddle the saw, the upper edges of the metal on each side of said slit being sharpened to a scraping edge, along the portion which comes near the saw-teeth for the purpose specified.

2. In a gin-saw-filing machine, a stand adapted to hold the machine in operative relation to the saw, and a frame carrying the operative parts and pivoted to the frame by means of a hinging-piece pivotally secured to said stand and to said frame at its back end, whereby said frame has motion in its own plane and adjustability vertically at its front end and means for holding said frame in its vertical adjustment and at the same time permitting said movement in its own plane, for the purpose specified.

3. In a gin-saw-filing machine, a stand and a frame carrying the operative parts and mounted thereon so as to have motion approximately in its own plane, a shaft mounted in said stand, an arm thereon connecting said shaft to said frame and a spring acting to partially rotate said shaft for the purpose specified.

4. In a gin-saw-filing machine, a stand and a frame carrying the operative parts and mounted on said stand so as to be movable approximately in its own plane, a shaft mounted in the stand, an arm thereon connected to said shaft and pivotally to the frame, a stud projecting from said shaft at an angle to said arm and a spring connected to the end of said stud for the purpose specified.

5. In a gin-saw-filing machine, a stand and a frame carrying the operative parts and mounted so as to be movable substantially in its own plane and adjustable vertically at one end, a shaft mounted in said stand and having arms projecting radially in the same direction from each of its ends, a spring connected to one of said arms and acting to partially rotate said shaft and a pitman connecting the distal extremity of the other arm to said frame and means for making rigid the connection between said arm and pitman for the purpose specified.

6. In a gin-saw-filing machine, a stand and a frame carrying the operative parts and mounted so as to be movable substantially in its own plane and adjustable vertically at one end, a shaft mounted in said stand and having arms projecting radially in the same direction from each of its ends, a spring connected to one of said arms and acting to partially rotate said shaft and a pitman connecting the distal extremity of the other arm to said frame and means for making rigid the connection between said arm and pitman consisting of a slot in said pitman and a screw passing through said slot into said arm.

7. In a gin-saw-filing machine, a frame carrying the operative parts, a stand adapted to hold said frame in operative relation to the saws, a feed-lever, a link suspending it fulcrumally upon said frame, a tooth-engaging bit on the forward end of said lever and projecting laterally therefrom consisting of a plate of metal thicker along its middle and beveled thinner to its upper and lower edges and means for securing same upon the forward end of said lever and of actuating said lever, for the purpose specified.

8. In a gin-saw-filing machine, a stand, a frame mounted thereon so as to have motion substantially in its own plane, a vibratory feed-lever having a bit adapted to engage in succession the teeth of the saw and means in operative relation to said feed-lever for limiting the forward movement of said frame for the purpose specified.

9. In a gin-saw-filing machine, a stand, a frame mounted thereon so as to have motion substantially in its own plane, a vibratory feed-lever having a bit adapted to engage in succession the teeth of the saw and means in operative relation to said feed-lever for limiting the forward movement of said frame consisting of an upwardly-projecting lug on said feed-lever and a correlative abutment on said frame.

10. In a gin-saw-filing machine, a stand, a frame mounted thereon so as to have motion substantially in its own plane, a vibratory feed-lever having a bit adapted to engage in succession the teeth of the saw and means in operative relation to said feed-lever for limiting the forward movement of said frame consisting of an upwardly-projecting lug on said feed-lever for limiting the forward movement of said frame consisting of an upwardly-projecting lug on said lever and a correlative abutment on said frame consisting of a pin eccentrically journaled rotatably on said frame.

11. In a gin-saw-filing machine, a frame carrying the operative parts, a stand, means for movably mounting said frame on said stand, a retaining-pawl, a bit on one end and the other extended backwardly, a cam adapted to lift said pawl as the saw is fed forward and an adjustable fulcrumal bearing for said pawl consisting of a vertically-slotted lug on said frame, a rotatable bushing set in said lever at its fulcrumal point and a screw fitting said slot and screwed into said bushing eccentrically thereof for the purpose specified.

12. In a gin-saw-filing machine, a stand and a frame mounted thereon carrying the operative parts, a feed-lever fulcrumed on said frame and means for causing a vibratory movement thereof consisting of a double crank rotatably mounted on the frame, and a pitman connected by its lower end to said lever and in its upper end engaging said double crank for the purpose specified, having a cam-shaped opening of the form described.

13. In a gin-saw-filing machine, a frame and means for holding same in operative relation to the saws, a shaft mounted on said frame so as to be partially rotatable thereon, means for elastically rotating said shaft, a guide mounted on said shaft, a double-ended carrier mounted reciprocably on said guide and means for securing a file to said carrier.

14. In a gin-saw-filing machine, a frame and a stand therefor adapted to hold same in operative relation to the saws, a shaft mounted in bearings on said frame, so as to be semi-rotatable thereon, means for elastically moving said shaft in either rotary direction, a guide on said shaft and a double-ended file-clamping carrier reciprocably mounted on said guide for the purpose specified.

15. In a gin-saw-filing machine, a frame and a stand therefor adapted to hold same in operative relation to the saws, a shaft mounted in bearings on said frame, so as to be semi-rotatable thereon, means for elastically moving said shaft in either rotary direction, a guide on said shaft and a double-ended file-clamping carrier reciprocably mounted on said guide consisting of a wrist on said carrier, crank-shaft rotatably mounted on said frame, a pitman connected to the wrists of said crank and said carrier and means for rotating said crank-shaft.

16. In a gin-saw-filing machine, a frame and a stand adapted to hold same in operative relation to the saws, an upright on said frame a shaft rotatably mounted on said upright, an arm carried on the back end of said shaft a spring connected at one end to said arm and at the other end stationarily, a guide carried on the opposite end of said shaft and a double-ended file-clamping carrier reciprocably mounted on said guide, for the purpose specified.

17. In a gin-saw-filing machine, a frame and a stand adapted to hold same in operative relation to the saws, a shaft rotatably mounted on the upper end of said frame an arm projecting from the back end of said shaft, a spring secured to said arm, means for adjusting the tension of said spring a guide mounted upon the other end of said shaft and a double-ended file-clamping carrier, mounted upon said guide so as to be reciprocable thereon for the purpose specified.

18. In a gin-saw-filing machine, a frame and a stand adapted to hold same in operative relation to the saws, a shaft rotatably mounted in the upper end of said frame, an arm secured to the back end of said shaft so as to be movable longitudinally across the end of same, a spring secured to said arm at its upper end, a guide secured to the other end of said shaft and a double-ended file-clamping carrier reciprocably mounted on said guide for the purpose specified.

19. In a gin-saw-filing machine, a frame and a stand adapted to hold same in operative relation to the saw, a shaft rotatably mounted in the upper end of said frame means for causing an elastic rotation of said shaft in either direction, an arm mounted on the front end of said shaft so as to move longitudinally across the end thereof a rod carried in and at substantially a right angle to the end of said arm and a double-ended file-clamping carrier reciprocably mounted on said rod for the purpose specified.

20. In a gin-saw-filing machine, a frame and a stand adapted to hold said frame in operative relation to the saw, a guide pivoted on said frame pendulously, a file-carrier mounted so as to reciprocate on said guide a cam-surface on said guide and a vertically-movable abutment adapted to be moved into operative relation to said cam-surface and by conjunctive operation therewith cause a lateral movement of said guide for the purpose specified.

21. In a gin-saw-filing machine, a frame and a stand adapted to hold said frame in operative relation to the saw, a guide pivoted pendulously upon said frame and having its lower end beveled, a file-clamping carrier mounted reciprocably on said guide, a retaining-pawl adapted to engage a tooth of the saw and vertically movable, and an abutment carried upon said retaining-pawl and adapted when same is elevated to come into operative relation with the beveled end of said guide for the purpose specified.

22. In a gin-saw-filing machine, a frame and a stand adapted to hold said frame in operative relation to the saw, a guide pivoted pendulously upon said frame and having its lower end beveled, a file-clamping carrier mounted reciprocably on said guide, a retaining-pawl adapted to engage a tooth of the saw and vertically movable, and an abutment carried upon said retaining-pawl and adapted when same is elevated to come into operative relation with the beveled end of said guide and flat-headed bolts screwed into the frame on either side of said retaining-pawl and adapted to guide same in its vertical movement, for the purpose specified.

In testimony whereof I hereunto affix my signature in presence of two witnesses.

ALBERT A. WOOD.

Witnesses:
 H. S. WESSON,
 DAN W. IRBY.